Aug. 30, 1932.  R. J. MINSHALL  1,874,570
RETRACTABLE LANDING GEAR
Filed Jan. 6, 1930   2 Sheets-Sheet 1

INVENTOR
Robert J. Minshall

Aug. 30, 1932.  R. J. MINSHALL  1,874,570
RETRACTABLE LANDING GEAR
Filed Jan. 6, 1930  2 Sheets-Sheet 2

INVENTOR
Robert J. Minshall

Patented Aug. 30, 1932

1,874,570

UNITED STATES PATENT OFFICE

ROBERT J. MINSHALL, OF SEATTLE, WASHINGTON, ASSIGNOR TO BOEING AIRPLANE COMPANY, OF SEATTLE, WASHINGTON

RETRACTABLE LANDING GEAR

Application filed January 6, 1930. Serial No. 418,955.

This invention relates to improvements in airplanes and more especially to the amphibian type wherein a boat hull is provided with a pair of lateral extensions, or float stubs, into which are adapted to be drawn and completely housed, the wheels of the landing gear preparatory to alighting on the water.

An object of the invention is to provide apparatus of this character which is of strong, durable construction, and which is actuated by a worm and worm gear to insure positive operation and to prevent accidental operation.

Another feature of the worm and worm gear is that the stresses of landing are imparted to the usual landing struts, which are of substantially the same design as the landing gear of the stationary type, now common in the art, instead of being directed through the operating mechanism.

Another object of the invention is the provision of means for completely housing the wheels when in their retracted position, the housing being located at the outermost end of the float stubs to provide additional buoyancy to the stubs.

These and other objects will appear as my invention is more fully hereinafter described in the following specification, illustrated in the accompanying drawings, and finally pointed out in the appended claims.

Figure 1:
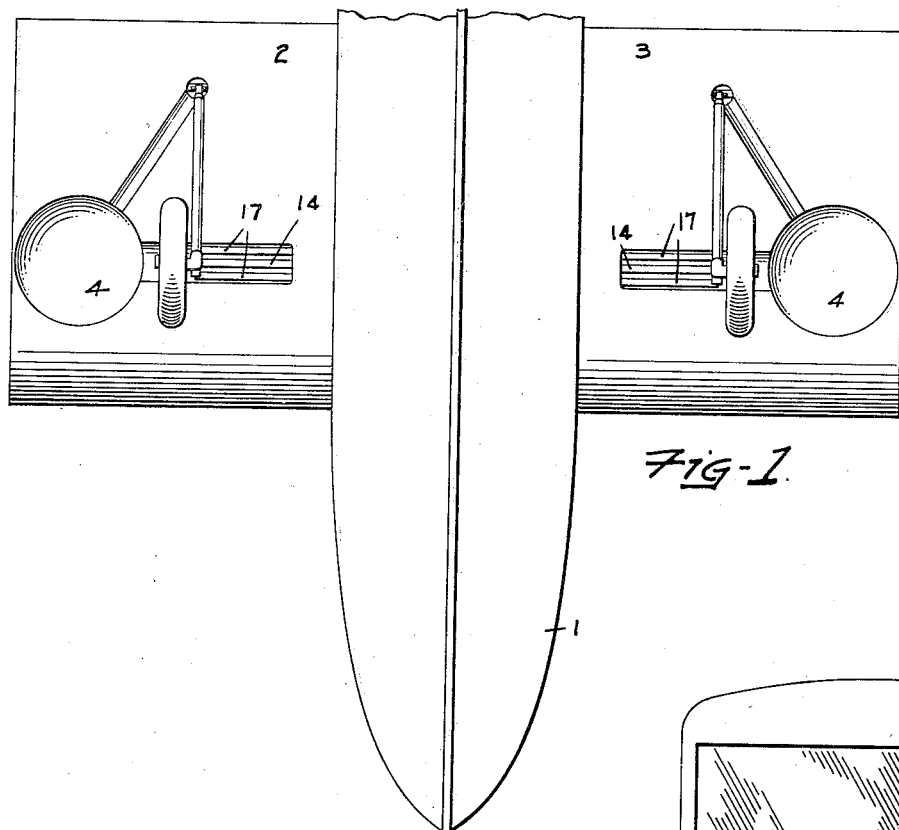
Figure 1 is a bottom plan view of a fragment of an amphibian hull showing my improved type of retractable landing gear operatively installed therein.

Referring now more particularly to the drawings:

Reference numeral 1 indicates a hull of the usual flying boat or amphibian, having laterally extending float stubs 2 and 3. Each of said float stubs is formed with a circular cavity 4 to house the wheels in their retracted positions. As both wheels and their retracting mechanisms are identical with each other, a description of one will suffice for both.

The wheel is resiliently mounted by means of any approved type of shock absorber to a strut 5, the upper end of which is secured to a worm gear 6 in such a way that when the strut is in operative position an upward thrust is resisted in the line of the pivot of the worm gear. Intermeshing with the worm gear is a worm 7 which is carried by a shaft 8. The shaft is rotatably mounted in bearings 9 and extends from one float stub to the other so that both wheels can be dealt with simultaneously. A hand crank 10 is rotatably mounted in the hull to rotate a sprocket wheel 11, which by means of a sprocket chain 12 drives a sprocket wheel 13 which is mounted on the shaft 8, so that as the crank is turned, both worms will rotate.

Extending outwardly from the hull, and rigidly braced within the wing stub is an arm 14, upon which is slidably mounted a collar 15 which is formed with lateral extensions 16. To the collar, by means of its extensions, are swingably mounted a pair of struts 17. The lower ends of the struts pivotally connect with the strut 5.

Figure 2:
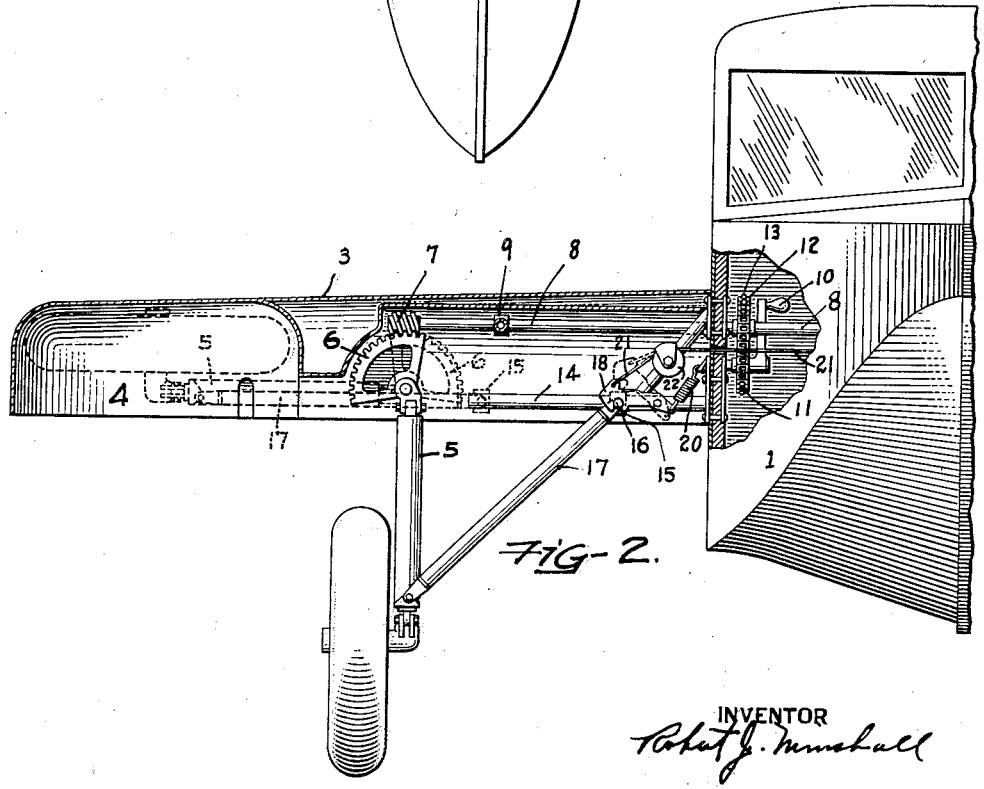
Figure 2 is a front sectional elevation of a wing stub and hull.
Figure 3:
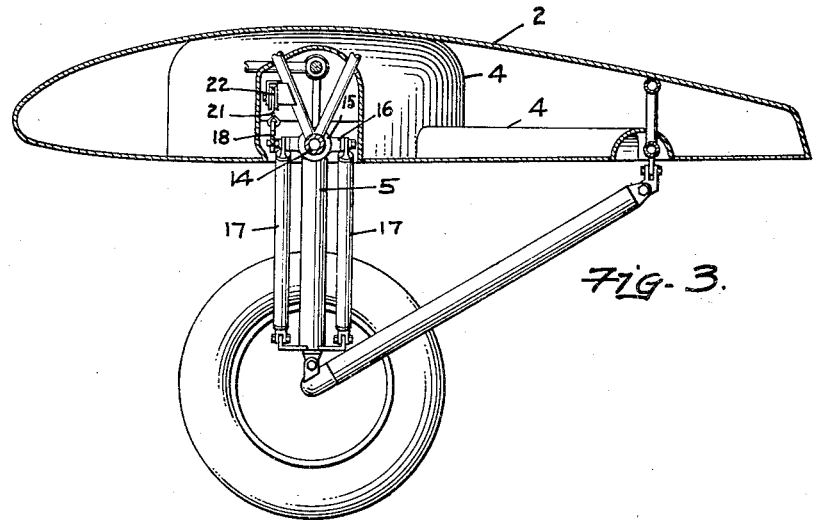
Figure 3 is a sectional view taken on the line 3—3 of Figure 2.
Figure 4:
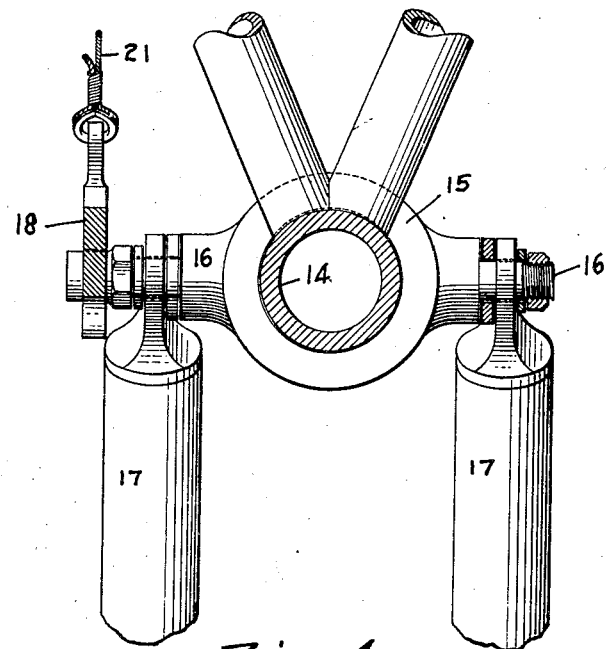
Figure 4 is an enlarged fragmentary detail view of a sliding means, for collapsing the struts.

When the shaft 8 is rotated the worm moves the worm gear into its dotted line position (Figure 2) with a resultant upward swing of the strut 5, the wheel, and the struts 17 until the wheel reaches the cavity 4 at which time the struts 17 will have reached a position parallel to the strut 5.

A hook 18 is pivotally mounted, by means of a bolt 19, to the arm 14. A spring 20 connects the rear end of the hook with the hull. A cable 21 connects with the opposite end of the hook and extends over a pulley 22 thence into the operator's compartment within the hull. When the struts 17 are in their full line position (Figure 2) the hook engages with one of the lateral extensions on the collar 15. When it is desired to retract the landing gear, a pull on the cable 21 disengages the hook from the extension on the collar, thus permitting the collar 15 to be moved along the arm 14.

It will be noted that the float stubs are water tight except for the portions adapted to receive the wheels and their retracting mechanisms.

While I have shown a particular form of embodiment of my invention, I am aware that many minor changes therein will readily suggest themselves to others skilled in the art without departing from the spirit and scope of my invention. Having thus described the invention, what I claim as new and desire to protect by Letters Patent is:—

1. In an airplane, in combination with a hull and a member rigid with and projecting laterally outwardly from the hull, a normally vertical strut pivotally supported upon said member upon an axis extending longitudinally of the airplane, a landing wheel supported upon the swinging end of said vertical strut, a lateral strut pivotally connected at its lower end to the swinging end of the vertical strut, and extending upwardly and inwardly to said first member, and means for moving the inner end of the lateral strut outwardly to swing the vertical strut and the wheel outwardly and upwardly.

2. In an airplane, in combination with a hull and a float stub projecting laterally therefrom and having a recess in its under side, a landing wheel, a vertical strut supporting the same at one end, and pivoted at its other end upon the float stub, inwardly of its end, a lateral strut connected at its lower end to the vertical strut, adjacent the wheel, and extending, when the landing wheel depends in operative position, laterally upward and inward, and means for moving the inner end of the lateral strut outwardly towards the pivot of the vertical strut, to swing the latter and the wheel outwardly into substantially horizontal position, disposed within said recess.

3. The combination of claim 1, the lateral strut being divided into a forward and a rear member lying in transverse planes respectively in front of and in rear of the transverse plane of the vertical strut, and parts being disposed and arranged to bring the lateral and vertical struts substantially into a common horizontal plane when retracted.

4. The combination of claim 1, the vertical strut having incorporated therein shock absorbing means.

5. The combination of claim 1, and a longitudinal strut connected at its lower end to the swinging end of the vertical strut, and pivotally mounted at its other end upon an axis rearwardly of and substantially coinciding with the axis of swing of the vertical strut.

6. The combination of claim 1, the vertical strut having incorporated therein shock absorbing means, and being mounted at its upper end for swinging movement upon a transverse axis, and a longitudinal strut connected at its lower end to the swinging end of the vertical strut for pivotal movement upon a transverse axis, and pivotally mounted upon the rigid member rearwardly of the vertical strut upon an axis substantially coinciding with the axis of swing of the vertical strut, and also for pivotal movement upon a transverse axis.

7. The combination of claim 1, the means for moving the lateral strut comprising a transversely extending guide rigid with the hull, a collar slidable thereon, a pivotal connection on a longitudinal axis between said collar and the lateral strut, and means under the control of the pilot for swinging the vertical strut on its longitudinal axis.

8. The combination of claim 1, the means for moving the lateral strut comprising a transversely extending guide rigid with the hull, a collar slidable thereon, a pivotal connection on a longitudinal axis between said collar and the lateral strut, means under the control of the pilot for swinging the vertical strut on its longitudinal axis, and latch means to secure said collar in position corresponding to operative position of the landing wheel.

9. In an airplane, the combination of a hull, a pair of laterally disposed float stubs attached to said hull, landing wheels, a vertical strut directly supporting each wheel, and a lateral strut bracing the same, the upper ends of said struts being hingedly supported on longitudinal axes from said float stubs, means for collapsing said struts and drawing them with their wheels upwardly and outwardly into substantially horizontal position, said means including a worm upon the upper end of the vertical strut and worm gear meshed therewith to swing the vertical strut, and a slidable support for the upper end of the lateral strut.

10. In an airplane, in combination with a hull and a float stub projecting laterally therefrom and having a recess in its under side, a landing wheel, a vertical strut supporting the same at one end, and pivoted at its other end upon the float stub, inwardly of its end, a lateral strut connected at its lower end to the vertical strut, adjacent the wheel, and extending, when the landing wheel depends in operative position, laterally upward and inward, means to lock the inner end of the lateral strut to maintain the landing wheel in operative position, and means for moving the inner end of the lateral strut outwardly towards the pivot of the vertical strut, to swing the latter and the wheel outwardly into substantially horizontal position, disposed within said recess.

ROBERT J. MINSHALL.